US012727676B2

(12) United States Patent
Davis et al.

(10) Patent No.: US 12,727,676 B2
(45) Date of Patent: Sep. 8, 2026

(54) FURNITURE JOINTS FOR INCREASED STABILITY IN MODULAR BEDS

(71) Applicant: Clark Davis, Provo, UT (US)

(72) Inventors: Clark Davis, Provo, UT (US); Garrett Debry, American Fork, UT (US); Paul Schmidt, Provo, UT (US); Jack Harmon, Saratoga Springs, UT (US); Michael Peine, Riverton, UT (US); Avery Meanea, Provo, UT (US)

( * ) Notice: Subject to any disclaimer, the term of this patent is extended or adjusted under 35 U.S.C. 154(b) by 210 days.

(21) Appl. No.: 18/395,194

(22) Filed: Dec. 22, 2023

(65) Prior Publication Data

US 2024/0206629 A1 Jun. 27, 2024

Related U.S. Application Data

(60) Provisional application No. 63/435,207, filed on Dec. 23, 2022.

(51) Int. Cl.

*A47C 19/00* (2006.01)
*F16B 12/56* (2006.01)
*F16B 12/58* (2006.01)

(52) U.S. Cl.

CPC ............ *A47C 19/005* (2013.01); *F16B 12/56* (2013.01); *F16B 12/58* (2013.01)

(58) Field of Classification Search

CPC ... A47C 19/005; A47C 19/021; A47C 19/022; A47C 19/024; A47C 19/025; A47C 19/04; A47C 19/124; A47C 21/003; A47C 19/02; A47C 19/028; A47C 19/207; A47C 19/20; A47C 19/045; F16B 12/56; F16B 12/58; F16B 12/125; F16B 12/46; F16B 2200/67;

(Continued)

(56) References Cited

U.S. PATENT DOCUMENTS 456,353 A 7/1891 Bower
919,257 A 4/1909 Seydewitz (Continued)

FOREIGN PATENT DOCUMENTS

CA 1255355 6/1989
CH 281702 3/1952

(Continued)

OTHER PUBLICATIONS

Celery Rocking Chair viewed at http://www.eroomservice.com/manufacturer/celery/ circa Dec. 3, 2011.

(Continued)

*Primary Examiner* — Madison Matthews
(74) *Attorney, Agent, or Firm* — PETERSON IP; Brett Peterson

(57) ABSTRACT

A modular bed allows users to reconfigure the bed to suit different room requirements and to suit different users. A bed leg may be attached to a bed rail with a dovetail tenon and socket to allow the bed leg to be removed if desired or to change length of style of the leg. The leg joint provides a highly stable and secure joint. A rail bracket may be used to attach bed rails to bed posts in different locations and in different configurations to allow the same bed components to form part of a floor bed, a conventional bed, a loft bed, or a bunk bed. The bed provides improved strength and stability.

17 Claims, 15 Drawing Sheets

(58) Field of Classification Search

CPC .......... F16B 12/22; F16B 12/26; F16B 12/42; F16B 2200/30; F16B 12/48; F16B 12/50; F16B 12/54; F16B 12/60; F16B 2200/20; F16B 2200/205; F16B 5/008; F16B 5/02; F16B 5/0614; F16B 7/22; A47B 47/0033; A47B 57/32; A47B 13/04; A47B 2230/0085; A47B 2230/0081; A47B 2230/0096; A47B 2220/0088; A47B 2009/006; Y10T 403/4602

USPC ..... 5/200.1, 279.1, 286, 288, 290, 296, 300; 403/352, 254, 381, 382, 403, DIG. 13

See application file for complete search history.

(56) References Cited

U.S. PATENT DOCUMENTS 981,532 A 1/1911 Cary
1,036,164 A 8/1912 Teppert
1,061,297 A 5/1913 Johnson
1,419,647 A 6/1922 Shepherdson
1,431,823 A 10/1922 Georges
1,747,900 A 2/1930 Jenny
1,903,631 A 4/1933 Morrison
1,940,117 A 12/1933 Carpos
1,981,646 A 11/1934 Hamley
2,240,256 A 4/1941 Elmendorf
2,279,864 A 4/1942 Eide
2,334,912 A 11/1943 Eide
2,369,930 A 2/1945 Wagner
D144,730 S 5/1946 Perrault
2,418,731 A 4/1947 Seitz
2,479,086 A 8/1949 Silverman
2,481,671 A 9/1949 John et al.
2,486,987 A 11/1949 Scarlett
2,518,955 A 8/1950 Stelzer
2,534,413 A 12/1950 Cenis
2,551,071 A 5/1951 Tyncs
D164,552 S 9/1951 Curtis
2,595,002 A 4/1952 Schneider
2,602,012 A 7/1952 Doty
2,615,771 A 10/1952 Curtis
2,632,498 A 3/1953 Curtis
2,672,181 A 3/1954 Rose
2,677,491 A 5/1954 Burger
2,703,724 A 3/1955 Der Yuen
2,720,253 A 10/1955 Turner
2,745,591 A 5/1956 Holt
2,786,789 A 3/1957 Carlson
2,792,877 A 5/1957 West
2,801,895 A 8/1957 Gass
2,825,101 A 3/1958 Rubsnstein
2,908,400 A 10/1959 Richter
3,053,598 A 9/1962 Cheslow
3,069,216 A 12/1962 Mona
3,089,675 A 5/1963 Lozier
3,149,880 A 9/1964 Steuer
3,186,027 A 6/1965 Merillat
3,262,405 A 7/1966 Sutton
3,300,170 A 1/1967 Charles
3,300,245 A 1/1967 Rumble
D212,601 S 11/1968 Rubsnstein
3,410,441 A 11/1968 Rhyne
3,527,497 A 9/1970 Self
3,547,491 A 12/1970 Bovasso
3,578,385 A 5/1971 Stiglitz
3,599,822 A 8/1971 Johnson
3,603,274 A 9/1971 Ferdinand
3,603,656 A 9/1971 Ferman
3,636,893 A 1/1972 Lange
3,674,328 A 7/1972 White et al.
3,684,285 A 8/1972 Kane
3,692,201 A 9/1972 Garduna
3,697,363 A 10/1972 Martinez
3,783,801 A 1/1974 Engman
3,788,700 A 1/1974 Wartes
3,811,715 A 5/1974 Brudy
3,812,977 A 5/1974 Glassman
3,831,533 A 8/1974 Kellogg
3,847,435 A 11/1974 Skinner
4,021,128 A 5/1977 Chiames
4,055,924 A 11/1977 Beaver
D247,596 S 3/1978 Osamu
4,082,356 A 4/1978 Johnson
4,089,084 A 5/1978 Droz
4,099,472 A 7/1978 Kellogg
4,103,818 A 8/1978 Raubenheimer
4,140,065 A 2/1979 Chacon
4,153,311 A 5/1979 Takhasaki
4,158,277 A 6/1979 Krempp et al.
4,188,067 A 2/1980 Elmer
4,191,113 A 3/1980 Hogberg
4,202,581 A 5/1980 Fleishman
4,225,180 A 9/1980 Gillis
4,258,464 A 3/1981 Ullman
4,348,052 A 9/1982 Roland
4,358,047 A 11/1982 Raubenheimer
4,390,204 A 6/1983 Fleishman
4,419,028 A 12/1983 Roland
4,433,753 A 2/1984 Watson
4,433,843 A 2/1984 Bricco
4,492,332 A 1/1985 Collins
4,501,512 A 2/1985 Hiltz
4,509,794 A 4/1985 Roland
4,533,174 A 8/1985 Fleishman
4,544,092 A 10/1985 Palmer
4,548,350 A 10/1985 Engle
4,574,917 A 3/1986 Stoddard
4,591,090 A 5/1986 Collins
4,593,950 A 6/1986 Vittorio
4,595,105 A 6/1986 Gold
D289,234 S 4/1987 Hoult
4,685,609 A 8/1987 Ferrari
4,706,573 A 11/1987 Sielaff
4,712,837 A 12/1987 Swilley
4,759,449 A 7/1988 Gold
D299,087 S 12/1988 Bruce
4,841,878 A 6/1989 Kriegsman
D302,216 S 7/1989 Roland
4,846,530 A 7/1989 Noble
4,867,327 A 9/1989 Roland
4,878,439 A 11/1989 Samson
4,882,807 A 11/1989 Frye
4,884,420 A 12/1989 Finkel
4,900,276 A 2/1990 Doutrich
4,926,759 A 5/1990 Vitsky et al.
4,930,753 A 6/1990 Alvyn
4,934,765 A 6/1990 Slifer
5,011,228 A 4/1991 Marcantel
5,062,733 A * 11/1991 Cholid .................. E04B 1/2604 403/189
5,069,144 A 12/1991 Williford
5,082,329 A 1/1992 Mars
5,253,594 A 10/1993 Sideris
5,253,595 A 10/1993 Heidmann
5,263,766 A 11/1993 McCullough
5,275,467 A 1/1994 Kawecki
5,343,816 A 9/1994 Sideris
5,354,589 A 10/1994 Waas
5,367,964 A 11/1994 Hockensmith
5,387,027 A 2/1995 Maloney
5,454,331 A 10/1995 Green
5,478,145 A 12/1995 Kamachi
5,605,378 A 2/1997 Oyediran
5,613,449 A 3/1997 Pullman
5,644,995 A 7/1997 Gurwell et al.
5,655,812 A 8/1997 Albecker
5,669,107 A 9/1997 Carlsen
5,706,741 A 1/1998 Thorp
5,720,537 A 2/1998 Lutz
5,752,611 A 5/1998 Nakagawa
5,765,922 A 6/1998 Hsia
5,803,548 A 9/1998 Battle
5,803,561 A 9/1998 Puehlhorn

(56) References Cited

U.S. PATENT DOCUMENTS 5,881,653 A 3/1999 Pfister
5,901,521 A 5/1999 Guy
5,921,631 A 7/1999 Bush
5,927,816 A 7/1999 Hsu
5,941,377 A 8/1999 Hart
5,992,938 A 11/1999 Jones
6,029,584 A 2/2000 Cochrane
6,036,270 A 3/2000 Bufalini
6,041,920 A 3/2000 Hart
D422,799 S 4/2000 Dworshak et al.
6,053,585 A 4/2000 Osen
6,109,695 A 8/2000 Kahwaji
6,126,022 A 10/2000 Merkel
6,155,641 A 12/2000 Frost
6,174,116 B1 1/2001 Brand
6,189,974 B1 2/2001 Beck
6,247,754 B1 6/2001 Vanderaue et al.
6,283,564 B1 9/2001 Corson
6,347,772 B1 2/2002 L'Hotel
6,359,174 B1 3/2002 Jones
6,378,707 B1 4/2002 Taggert
6,427,956 B1 8/2002 Heckmann
6,443,076 B1 9/2002 Case
6,453,973 B1 9/2002 Russo
6,474,901 B1 * 11/2002 Thurston ................ F16B 12/50 403/381
6,532,878 B2 3/2003 Tidemann
6,595,378 B2 7/2003 Wang
6,615,746 B2 9/2003 Bart
6,615,999 B1 9/2003 Culp
6,619,749 B2 9/2003 Willy
6,675,979 B2 1/2004 Taylor
6,769,369 B1 8/2004 Brandenberg
6,807,912 B2 10/2004 Willy
D499,577 S 12/2004 Willy
6,845,871 B1 1/2005 Culp
6,848,747 B1 2/2005 Robinson
RE38,707 E 3/2005 Merkel
6,895,870 B1 5/2005 Bizlewicz
6,955,401 B1 10/2005 Shoulberg
6,994,222 B2 2/2006 Hunt
7,066,548 B2 6/2006 Butler
7,114,300 B1 10/2006 Culp
7,168,766 B2 1/2007 Pelletier
7,219,962 B2 5/2007 Stone
D547,076 S 7/2007 Hughes et al.
7,255,403 B2 8/2007 Butler
7,290,342 B2 11/2007 Hartmann
7,300,110 B1 11/2007 Debien
7,386,960 B2 6/2008 Molteni
7,488,136 B2 2/2009 Chen
7,533,940 B1 5/2009 Zook
7,631,605 B2 12/2009 Willy
7,765,942 B2 8/2010 Choi
7,856,772 B1 12/2010 Culp et al.
8,006,328 B2 * 8/2011 Polevoy ............... A47C 19/005 5/200.1
8,123,311 B2 2/2012 Nilsson
8,167,377 B2 5/2012 Kovach
8,215,245 B2 7/2012 Morrison
8,220,399 B2 7/2012 Berent et al.
8,332,917 B2 12/2012 Forster et al.
8,459,476 B2 6/2013 Malekmadani
8,528,979 B2 9/2013 College
8,590,976 B2 11/2013 Davis
8,651,298 B2 2/2014 Beaty
8,667,911 B2 3/2014 Brandenberg
8,863,470 B2 10/2014 Bottorff
9,220,994 B2 12/2015 Murphy
9,277,814 B2 3/2016 Winker
9,282,819 B2 3/2016 Blake
9,447,804 B2 9/2016 Andersson
9,534,623 B2 1/2017 Anderson et al.
9,615,663 B2 4/2017 Davis
9,668,573 B2 6/2017 Salani
9,706,836 B1 7/2017 Nelson
9,719,542 B2 8/2017 Cappelle
10,138,917 B2 11/2018 Koch
10,195,974 B2 2/2019 Zhang
10,227,162 B2 3/2019 Davis
10,415,612 B2 9/2019 Davis
10,434,912 B2 10/2019 Zapf
10,657,617 B1 * 5/2020 Wang ........................ G06T 7/73
10,660,433 B1 5/2020 Jomaa
10,687,617 B2 6/2020 Davis
10,823,214 B2 11/2020 Davis
11,083,293 B2 8/2021 Davis
11,085,474 B2 8/2021 Davis
11,154,137 B2 10/2021 Davis
11,346,382 B2 5/2022 Davis et al.
11,578,739 B2 2/2023 Davis
11,767,867 B2 9/2023 Davis et al.
2003/0107255 A1 6/2003 Willy
2004/0056526 A1 3/2004 Willy
2004/0227041 A1 11/2004 Lewis
2005/0155232 A1 7/2005 Bocka
2007/0169429 A1 7/2007 Wu
2007/0187348 A1 8/2007 Malekmadani
2008/0074013 A1 3/2008 Ahlgrim et al.
2008/0302748 A1 12/2008 Tsai
2009/0066140 A1 3/2009 Berent et al.
2009/0084740 A1 4/2009 Lin
2010/0003077 A1 1/2010 Kelley
2012/0080910 A1 4/2012 Davis
2013/0062294 A1 3/2013 Beaty
2013/0080286 A1 3/2013 Rotholz
2013/0170904 A1 7/2013 Cappelle
2014/0048176 A1 2/2014 Susnjara
2014/0048177 A1 2/2014 Susnjara
2014/0059829 A1 3/2014 Weber
2014/0186104 A1 7/2014 Hamberger
2014/0263130 A1 9/2014 Davis
2015/0144578 A1 5/2015 Maiden
2015/0173989 A1 6/2015 Mitchell
2015/0183177 A1 7/2015 Blay
2015/0230600 A1 8/2015 Schulte
2015/0335155 A1 11/2015 Winker
2017/0023043 A1 1/2017 Koelling et al.
2017/0058926 A1 3/2017 Takubo
2017/0079426 A1 3/2017 Davis
2017/0086578 A1 3/2017 Nowak
2017/0099961 A1 4/2017 Church
2017/0265650 A1 9/2017 Adair
2017/0321734 A1 11/2017 Maertens
2017/0340107 A1 11/2017 Shen
2018/0112696 A1 4/2018 Davis
2019/0038023 A1 2/2019 Stocker
2019/0040890 A1 2/2019 Davis
2019/0059593 A1 2/2019 Davis
2019/0059594 A1 2/2019 Davis
2019/0085886 A1 3/2019 Davis
2019/0107131 A1 4/2019 Davis
2019/0254424 A1 8/2019 Rassat
2020/0370585 A1 11/2020 Huang

FOREIGN PATENT DOCUMENTS

DE 1529719 5/1969
DE 2100168 11/1972
DE 3925302 2/1991
DE 3925302 A1 * 2/1991 .......... A47B 57/425
DE 9201692 4/1992
DE 29914896 12/1999
DE 29906711 1/2000
DE 102007058662 6/2009
DE 102014006155 10/2014
EP 0299695 1/1989
FR 1300853 8/1962
FR 2634991 2/1990
FR 2654164 5/1991
GB 143840 12/1920
GB 810752 3/1959
GB 2353080 2/2001

(56) References Cited

FOREIGN PATENT DOCUMENTS

| | | | |
|---|---|---|---|
| KR | 101180268 B1 * | 9/2012 | ........... A47C 19/021 |
| NL | 1025719 | 9/2005 | |
| WO | WO 2005-085656 | 9/2005 | |

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

* cited by examiner 6
14
126
90
70
122
114
134
130
122A
134
42
74
94
94
114A

FURNITURE JOINTS FOR INCREASED STABILITY IN MODULAR BEDS

PRIORITY

The present application claims the benefit of U.S. Provisional Application Ser. No. 63/435,207, filed Dec. 23, 2022, which is herein incorporated by reference in its entirety.

THE FIELD OF THE INVENTION

The present invention relates to furniture joints. In particular, examples of the present invention relate to joints which may be used in beds to increase the stability and versatility of the beds.

INTRODUCTION

A significant amount of furniture sold today is premanufactured furniture which is partially assembled and receives final assembly from the purchaser. This furniture often relies on screws or cam lock fasteners to hold preformed panels, rails, legs, and other pieces together. This furniture often suffers from instability, allowing movement in the joints. This makes the furniture seem wobbly to a user and lowers the user satisfaction with the furniture. The fasteners in these types of furniture joints also tend to loosen over time and the furniture becomes wobblier, compromising the safety, utility, and desirability of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
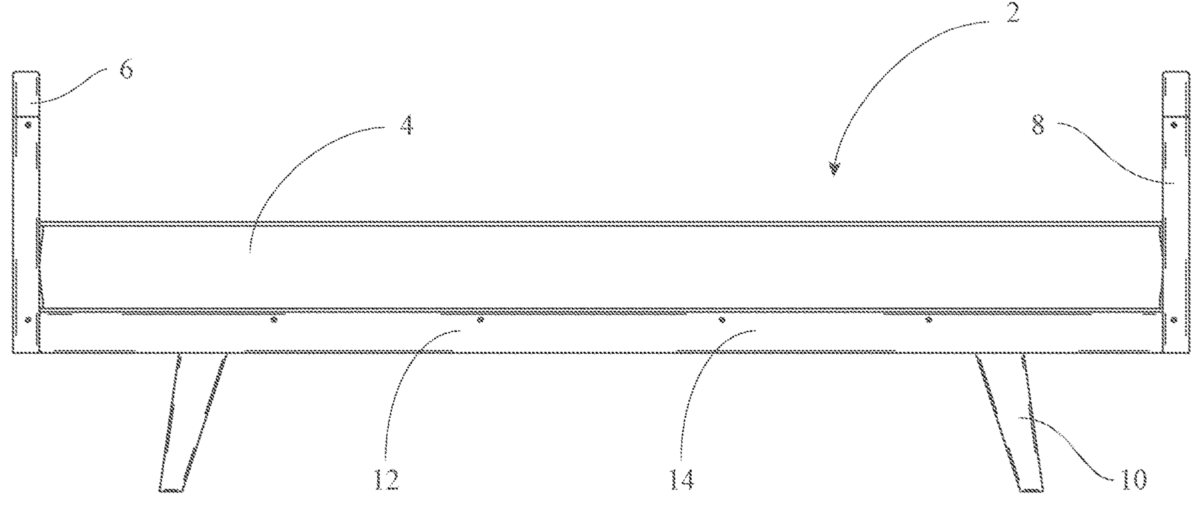
FIG. 1 shows a side view drawing of a bed.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be a significant figure above or a significant figure below the number or endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range.

The disclosure describes furniture joints which increase the strength and rigidity of the furniture item. In particular, the disclosure describes a joint for a bed leg which allows the leg to be attached to the bed rail rather than being part of the bed posts. This leg joint secures the leg in such a way as to eliminate rocking and looseness of the leg. The leg joint provides greater versatility for the bed, as it allows the bed to be used as a floor bed without legs, a platform bed with short legs, or a taller bed with longer legs. This allows a bed to be used by young children and allows for continued use of the bed as the children age and the use requirements change. The disclosure also describes a modular bracket system for attaching bed rails to headboards, footboards, and bed posts. The bracket system allows a bed to be assembled in different configurations to place the bed frame and mattress at different heights while using the same pieces. The bracket system also allows a bed to be attached to additional rail and post components to create a loft bed or bunk bed while using the same hardware and components.

FIG. 1 shows a drawing of a bed 2. The bed 2 includes a bed frame 12 with side and end frame rails 14 and an array of slats that supports a mattress 4. The bed 2 may include a head board 6 or a foot board 8. The bed 2 includes feet/legs 10 which are attached to the bed frame 12 and support the bed frame 12 above the ground. The legs 10 are attached to frame rails 14 such as the side rails or end rails and raise the bed off of the ground to a desired height.

Figure 2:
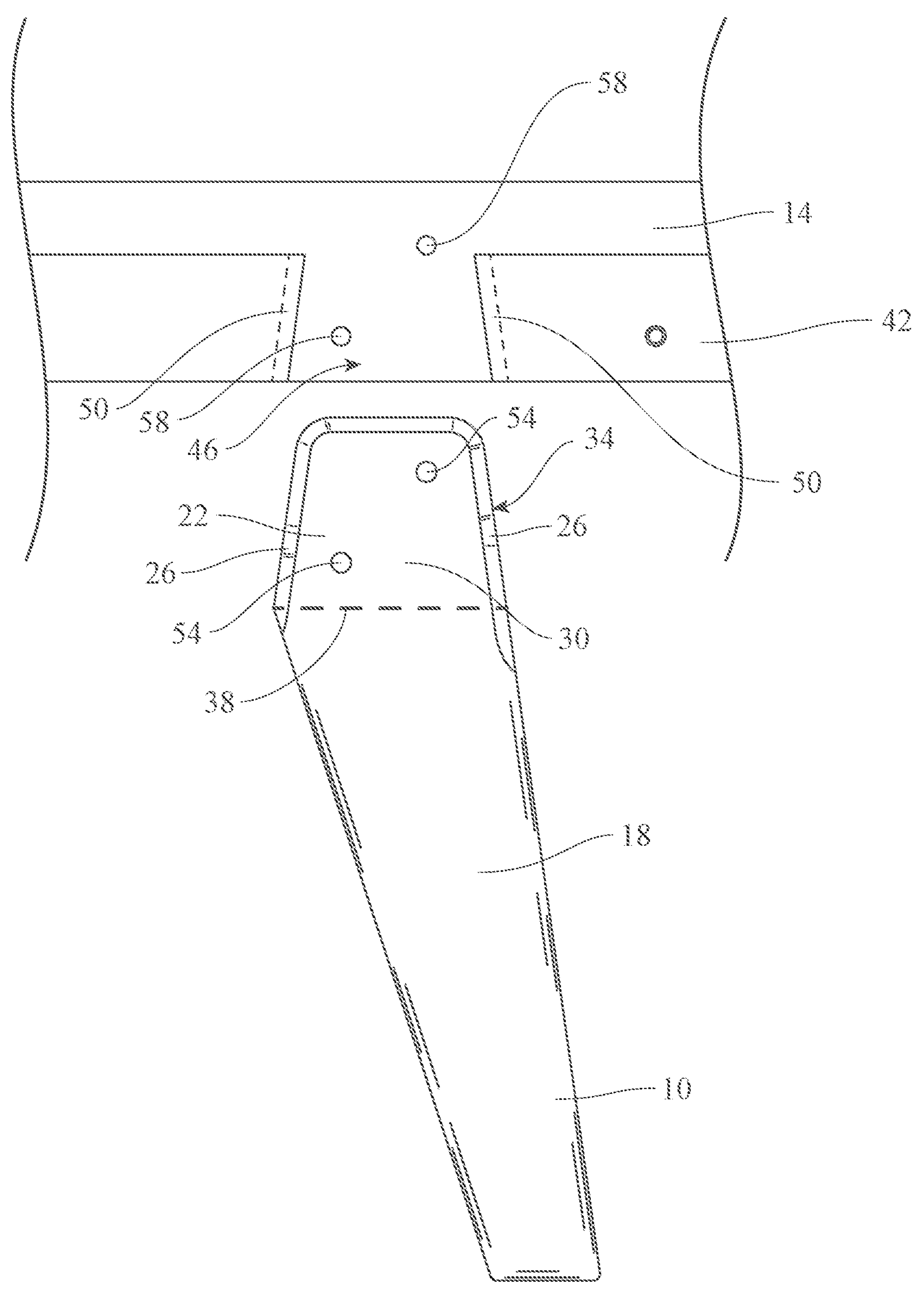
FIG. 2 shows a side view drawing of the bed leg and rail.

FIG. 2 shows a drawing of the inside faces of the bed leg 10 and the bed rail 14 to illustrate the joint therebetween. The bed leg 10 includes an elongate leg portion 18 which has a length selected to elevate a bed a desired distance from the floor. The bed leg 10 also includes a dovetail tenon 22 which extends upwardly from the leg portion 18 and forms a top of the leg 10. The dovetail tenon 22 includes a bottom end which is joined to the leg portion and a top end. The dovetail tenon 22 includes sides 26 which taper inwardly towards the top end of the leg 10 and which taper inwardly toward the first (inside) face 30 of leg 10. The dovetail tenon 22 is tapered in two directions; inwardly and upwardly. This causes the dovetail tenon 22 to have a tight fit in a correspondingly shaped socket in the bed rail 14 and the weight of the bed pressing the tenon 22 into the socket tightens the fit of the dovetail tenon 22 and helps stabilize the leg 10 and prevent a wobbly bed leg. The opposite face 34 of the tenon 22 may be recessed between dashed line 38 and the upper end of the tenon 22, forming a horizontal surface along line 38 that is adjacent the bottom of the bed rail 14 when the leg 10 is installed.

The bed rail 14 is formed from an elongate piece of wood. Rails 14 typically extend along the sides and ends of the bed frame 12 to support the bed slats and mattress. The leg 10 attaches to the rail 14 to elevate the bed from the floor a desired distance. The leg dovetail tenon is received in a corresponding dovetail socket in the rail. A rail cleat 42 is attached to the inside face of the rail 14. The rail cleat 42 extends along the rail 14 and can function to support slats which extend across the bed and hold the mattress. The rail cleat 42 forms a dovetail socket 46 which receives the dovetail tenon 22 of the leg 10. The dovetail socket 46 includes sides 50 which are tapered to match the tapered sides 26 of the dovetail tenon 22. The sides 50 of the dovetail socket 46 may be formed by angled cuts in the rail cleat 42. The tenon 22 also includes bolt holes 54 which correspond to threaded holes/inserts 58 in the rail 14. The leg 10 is typically attached to the bed rail 14 by seating the dovetail tenon 22 into the dovetail socket 46 and then securing the tenon 22 with fasteners which pass through the holes 54 and into the holes 58. The dovetail tenon 22 and the rail cleats 42 are typically attached to the inside face of the rail 14, allowing these to support any slats or sheet material used to support the mattress 4. The leg 10 may be attached to the bed rail 14 by bolts which thread into threaded inserts installed to create threaded holes 58. The leg 10 may also be attached to the bed rail by screws or bolts which thread directly into the rail 14 at hole 58. In some examples, a screw may create hole 58 as it is attached to the rail 14.

When the bed is in use, the weight of the bed presses the dovetail tenon 22 into the dovetail socket 46 and tightens the joint between the leg 10 and the rail 14. The dovetail tenon 22 is tapered from bottom to top such that the top of the dovetail tenon 22 is narrower than the bottom of the tenon. The dovetail tenon 22 is also tapered from back to front such that the sides 26 of the tenon taper inwardly towards the first face 30 (away from the rail 14). The dovetail socket 46 also tapers vertically so that the top end of the socket is narrower than the bottom end of the socket. The socket also has sides which taper such that an inner face of the socket (against the rail 14) is wider than an outer face of the socket (away from the rail). Pressing the leg 10 upwardly towards the rail 14 increases the contact pressure between the sides 26 of the tenon 22 and the sides 50 of the socket 46 and also presses the face of the tenon 22 against the inside face of the rail 14, stabilizing the dovetail tenon against movement back and forth along the length of the rail 14 and side to side across the rail 14.

The joint includes a primary wedge between the tenon 22 and socket 46 created by the taper from the bottom to the top of the tenon 22 and socket 46. This primary wedge stabilizes the joint against rocking in the plane of the tenon 22 and socket 46 and along the rail 14. The joint also includes a secondary wedge created by the taper from the wider tenon inner face 34 and the narrower tenon outer face 30 and the corresponding taper in the sides 50 of the socket 46. This prevents rocking of the leg 22 back and forth in a direction generally perpendicular to the rail 14. The combination of the primary wedge and the secondary wedge in the joint between the leg tenon 22 and rail socket 46 creates a tight and stable joint. The joint also prevents twisting of the leg 10 relative to the rail 14. While hardware such as fasteners 62 provide some strength to the leg joint, the joint is stable independent of the fasteners 62. As a result, the bed 2 can still be functional even if the fasteners 62 are omitted or improperly installed as the combination wedge joint provides stability to the leg 10.

Figure 3:
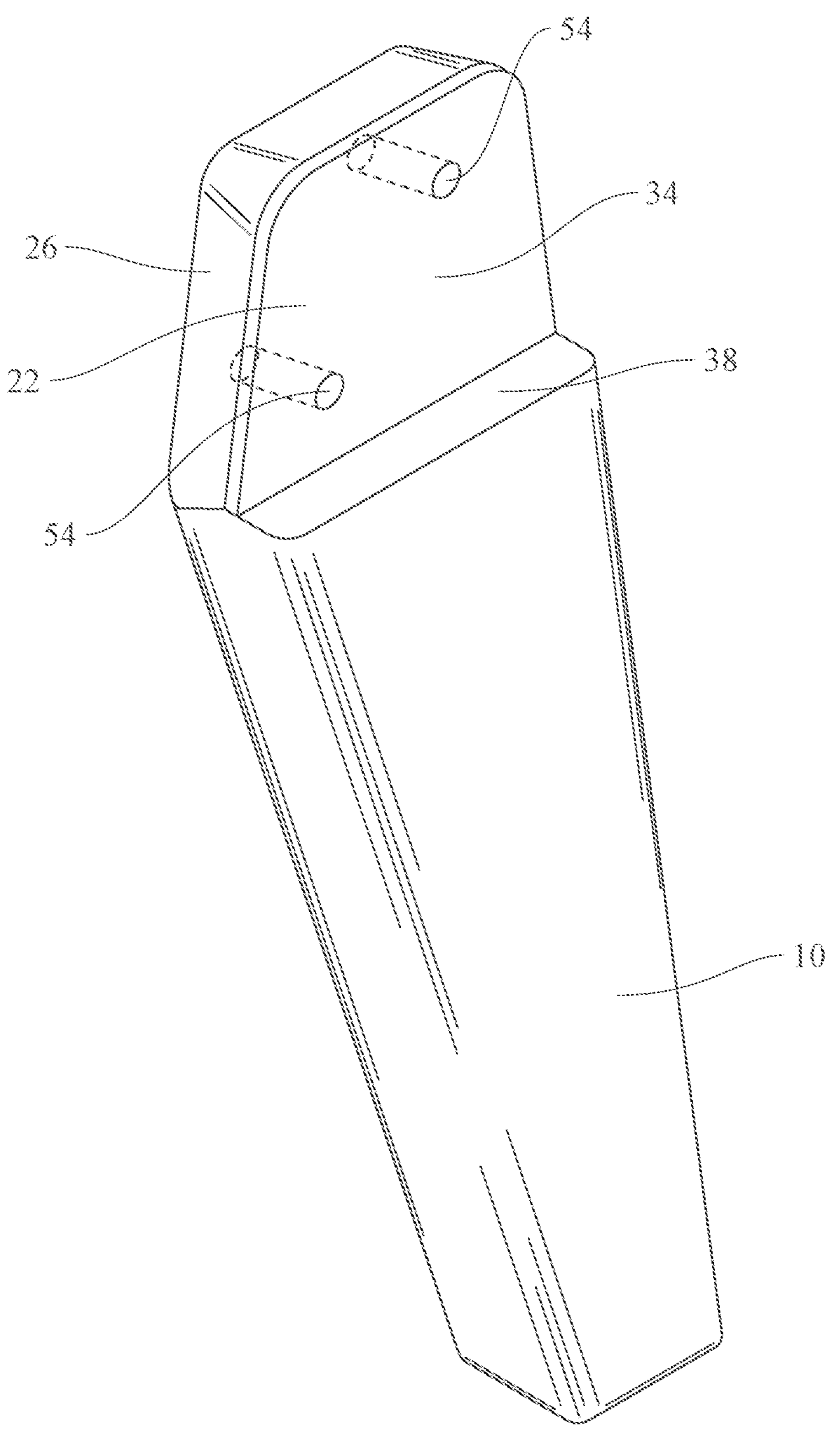
FIG. 3 shows a perspective view drawing of the leg.

FIG. 3 shows a perspective view of the leg 10. The opposite side (outside) of the leg 10 is shown, better illustrating the recessed face 34 and the ledge 38. When assembled, the ledge 38 may rest against the bottom edge of the rail 14 to support the rail 14. Alternatively, space may be left between the ledge 38 and the bottom of the rail 14 to ensure a tight joint between the tapered edges 26 of the dovetail tenon 22 and the tapered edges 50 of the dovetail socket 46.

Figure 4:
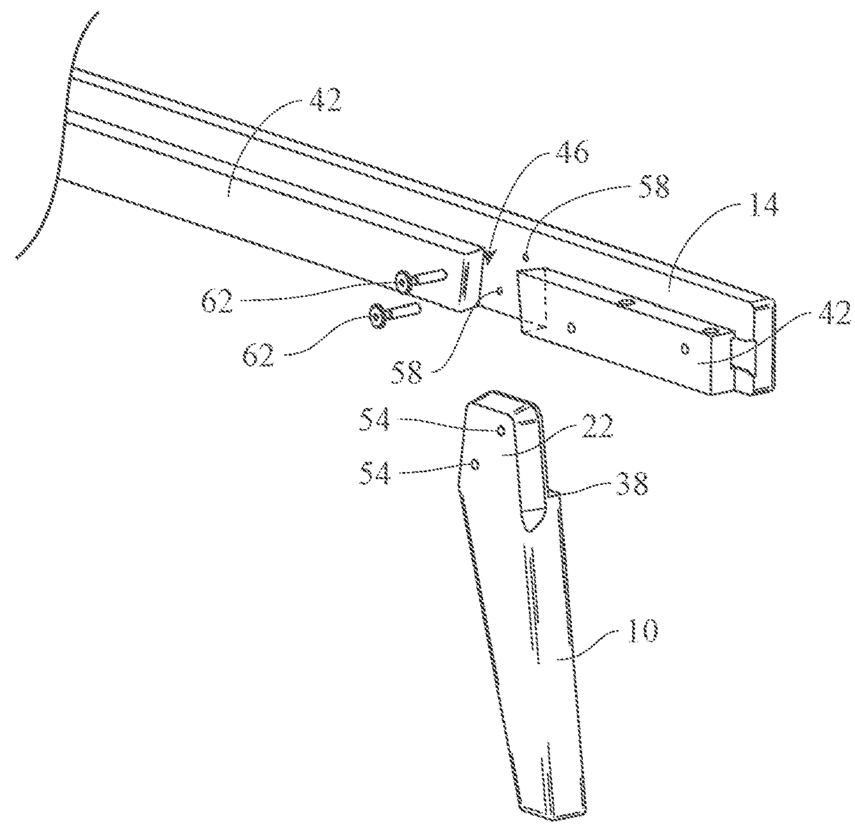
FIG. 4 shows a perspective view drawing of the leg and rail.
Figure 5:
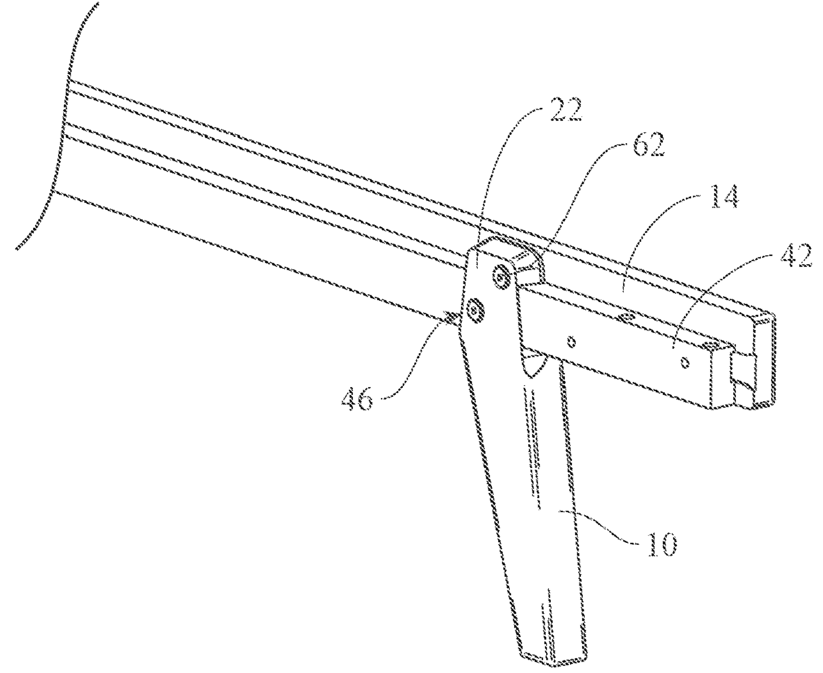
FIG. 5 shows a perspective view drawing of the leg and rail.

FIG. 4 shows an exploded view of the joint between the leg 10 and the rail 14. FIG. 5 shows a similar assembled view of the joint between the leg 10 and the rail 14. These figures also illustrate fasteners 62 such as threaded screws or bolts which pass through holes 54 in the dovetail tenon 22 and are attached to the rail 14, such as by threading into a hole 58 in the rail 14. As seen, the top end of the leg 10 may extend past the top of the rail cleat 42 and may be unused for the joint between the rail 14 and the leg 10. This allows the sides 26 of the tenon 22 to fit tightly against the sides 50 of the rail socket 46.

Figure 6:
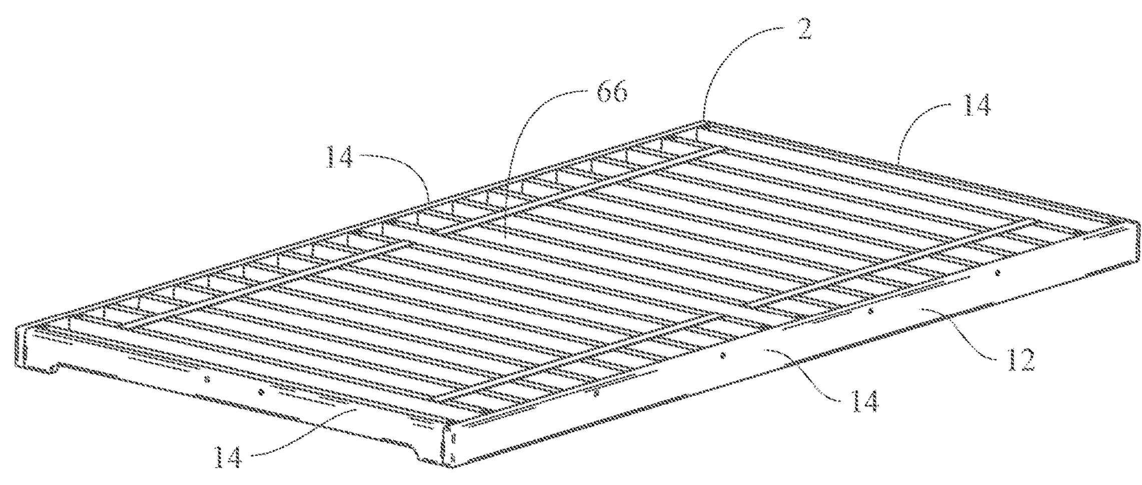
FIG. 6 shows a perspective view drawing of the bed in a first configuration.
Figure 7:
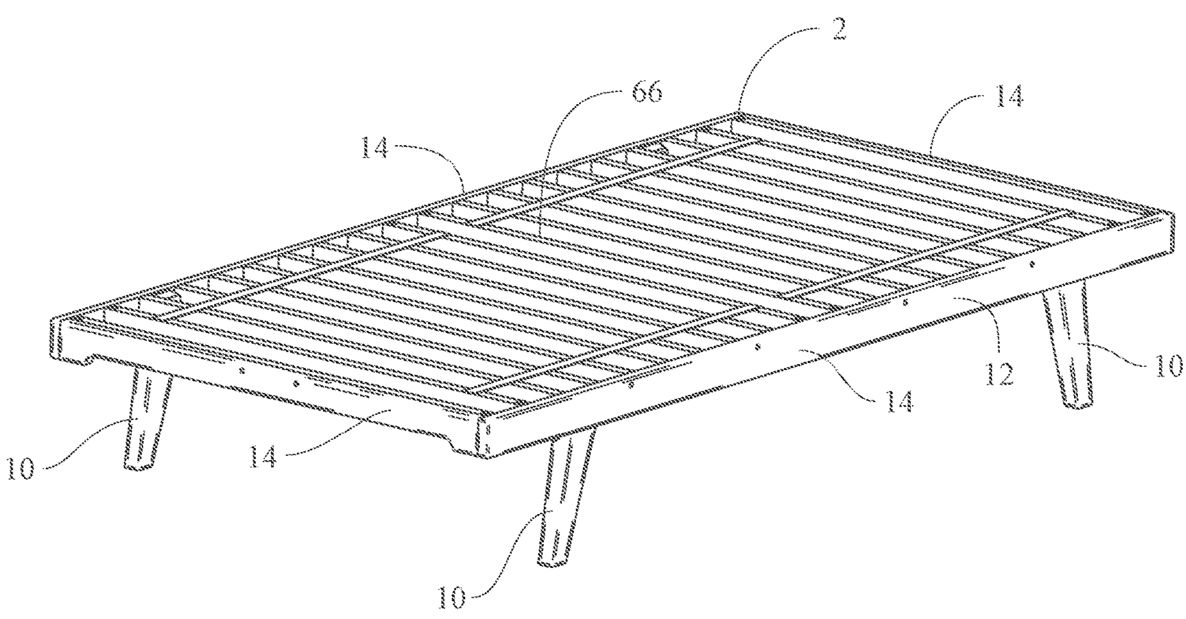
FIG. 7 shows a perspective view drawing of the bed in a second configuration.

FIG. 6 shows a perspective view of a simple bed 2 without legs 10. In this configuration, the bed 2 may be used with young children who are learning to sleep in a bed 2 but who are not yet able to easily climb into a raised bed. The bed frame 12 includes a series of slats 66 which support the mattress 4. FIG. 6 shows how rails 14 at the head and foot of the bed may include a vent to allow air circulation beneath the bed when the bed frame is used without legs 10 and prevent moisture buildup between the mattress and the floor. The vent may be a cutaway portion along the bottom of the rail 14 as illustrated here. FIG. 7 shows the same bed 2 with legs 10 attached to rails 14. In this configuration, the bed 2 may be used by a person who wants the bed to be elevated off of the floor. The joint attaching the leg 10 to the bed frame allows the bed to be used in these different configurations, or to be used with legs 10 of differing heights, while maintaining an attractive appearance and while providing a bed 2 that is strong and stable. The length of the leg 10, the angle of the leg 10 relative to the rail 14, or even the shape of the leg 10 may be changed while preserving the shape of the dovetail tenon 22; allowing the functionality and appearance of the bed to be changed by only changing the bed legs 10.

Figure 8:
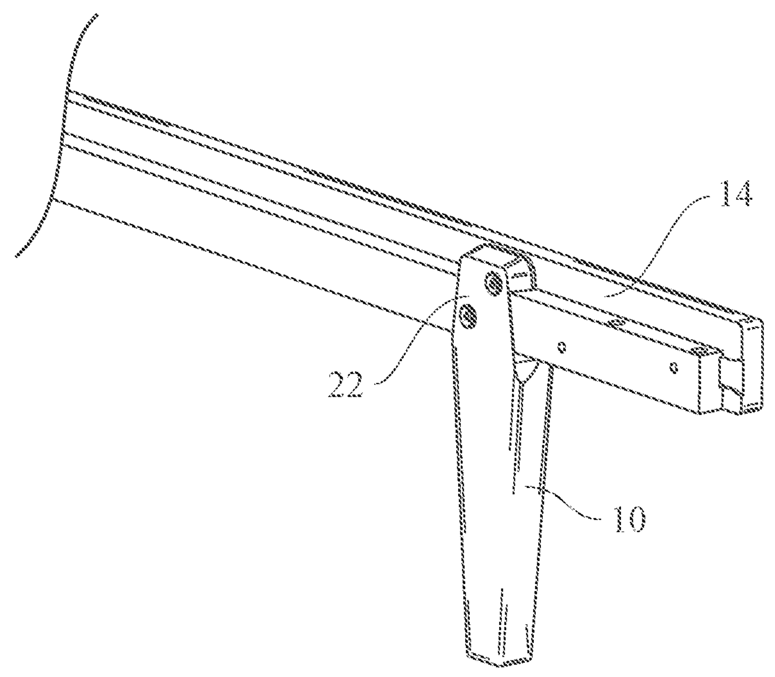
FIG. 8 shows a perspective view drawing of the leg and rail.
Figure 9:
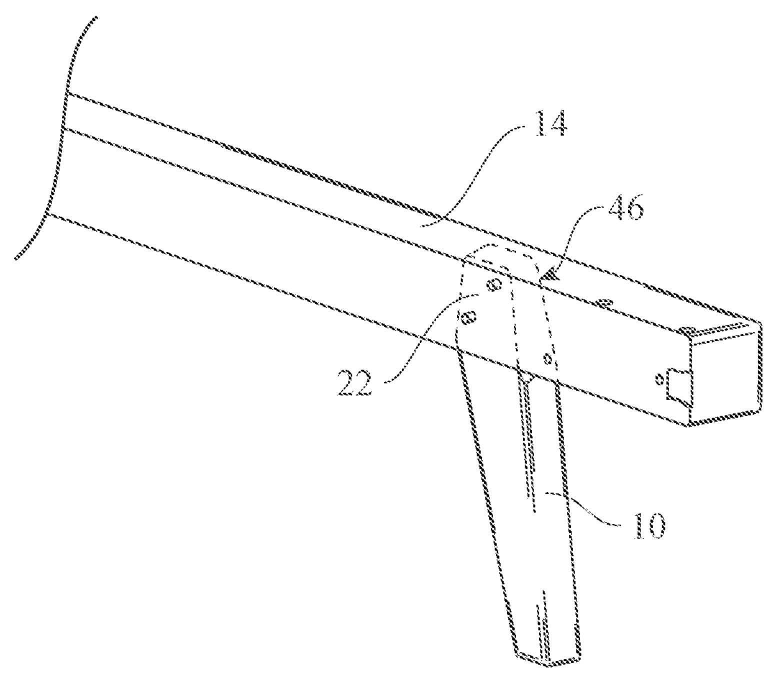
FIG. 9 shows a perspective view drawing of the leg and rail.

FIG. 8 shows how the leg 10 may extend vertically from the rail 14 instead of extending at an angle. FIG. 9 shows how the leg 10 may be attached to a dovetail socket 46 on the outside of a rail 14 and how the dovetail socket 46 may be formed in the rail 14 instead of being formed by rail cleats 42. The double taper between mating surfaces of the dovetail tenon 22 and the dovetail socket 46 create a tight fit that is tightened in use by placing weight on the bed 2. The dovetail joint provides a significant amount of surface area between the tenon and socket and is resistant to deformation and degradation that may loosen a joint. The joint naturally resists the rocking motion that may be created when people get on and off of a bed and significantly increases the stability of the bed.

Figure 10:
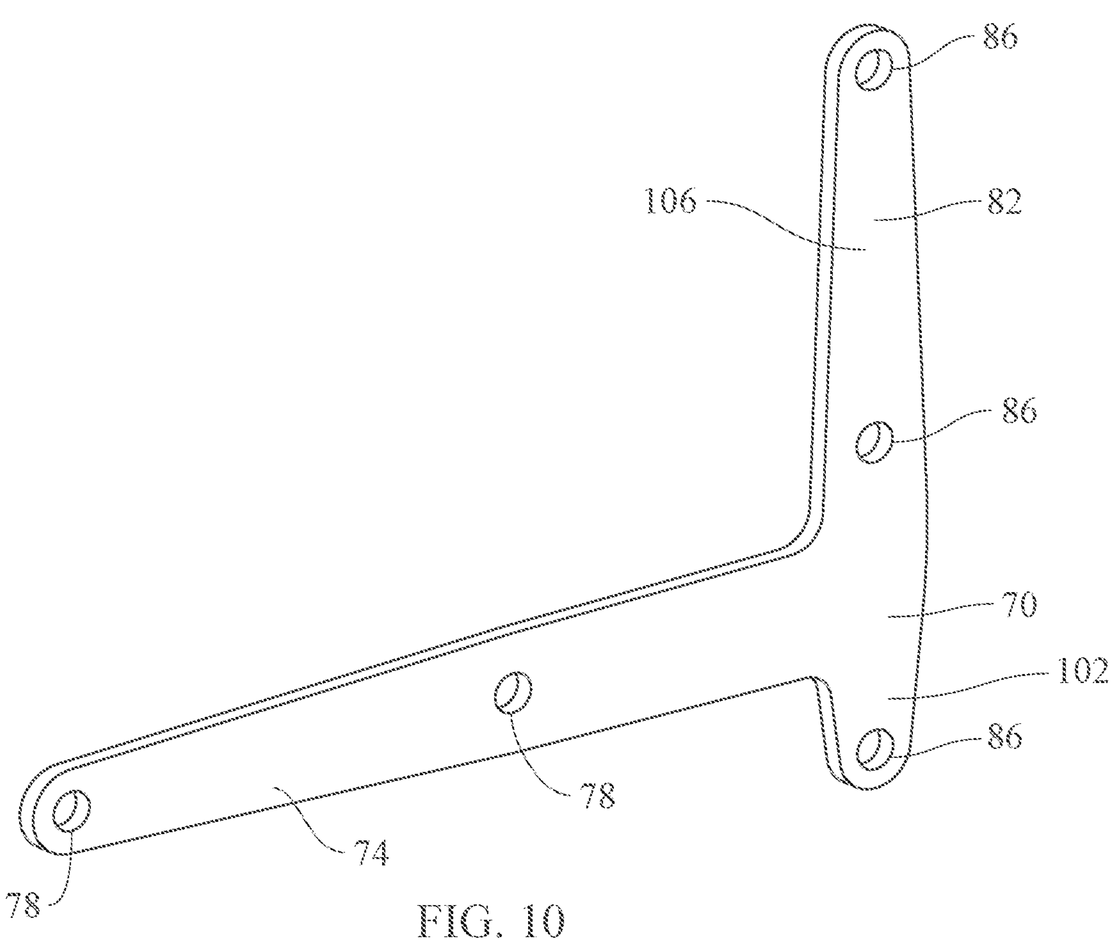
FIG. 10 shows a perspective view drawing of a rail bracket.

FIG. 10 shows a rail bracket 70 which may be used to connect bed rails to bed posts, headboards, or bed footboards and to change the configuration of the bed without requiring a change in the hardware used to build the bed. The rail bracket 70 includes a horizontal rail arm 74 with fastener holes 78. The horizontal rail arm 74 extends horizontally from a vertical head 82. The vertical head 82 is attached to bed posts and includes fastener holes 86. The horizontal arm 74 is attached to the vertical arm between the two ends so that the vertical head 82 extends above and below the horizontal arm 74 in a T shape. The vertical head 82 includes a first, long vertical arm segment 106 which extends above the horizontal rail arm 74 and a second, short vertical arm segment 102 which extends below the horizontal rail arm 74. The vertical arm segments 106, 102 extend generally at right angles to the horizontal rail arm 74. The first vertical arm segment 106 is longer than the second vertical arm segment 102; creating a bracket with asymmetrical vertical arms. The long vertical arm segment 106 is between about two times and about five times as long as the short vertical arm segment. More preferably, the long vertical arm segment is between about 3 and about 5 times as long as the short vertical arm segment, or more preferably between about 3 and about 4 times as long as the short vertical arm segment. The asymmetrical vertical arm segments allow the bracket 70 to be inverted and used in different locations on a bed post to mount the bed rails 14 at different heights. The asymmetrical vertical arm segments 106, 102 allow the rail to be mounted close to the floor or close to headboard rails without exposing the bracket and while maximizing strength in the resulting joint.

Figure 11:
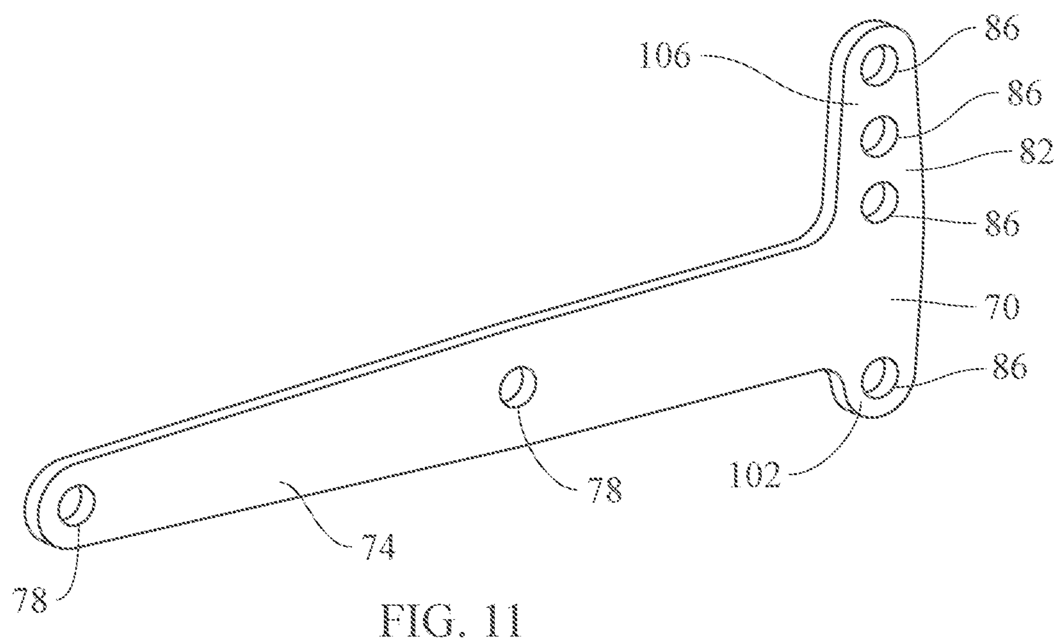
FIG. 11 shows a perspective view drawing of a rail bracket.

FIG. 11 shows another rail bracket 70 which may be used to connect bed rails to bed posts, headboards, or bed footboards and to change the configuration of the bed. The rail bracket 70 includes a horizontal arm 74 with fastener holes 78 and a vertical head 82 with fastener holes 86. The horizontal arm 74 is attached to the vertical head between the two ends so that the vertical head 82 includes a first vertical arm segment 106 that extends above the horizontal arm 74 and a second vertical arm segment 102 that extends below the horizontal arm 74. The large rail bracket 70 of FIG. 10 has a longer vertical head 82 while the small rail bracket 70 of FIG. 11 has a shorter vertical head 82. The large rail bracket 70 has a longer first vertical arm segment 106 and a longer second vertical arm segment 102. The small rail bracket 70 has a shorter vertical arm segment 106 and a shorter vertical arm segment 102. Both the long bracket 70 and the short bracket 70 are flat brackets; increasing the strength and rigidity of the brackets 70. The horizontal arm 74 is oriented perpendicularly to the vertical head 82.

Figure 12:
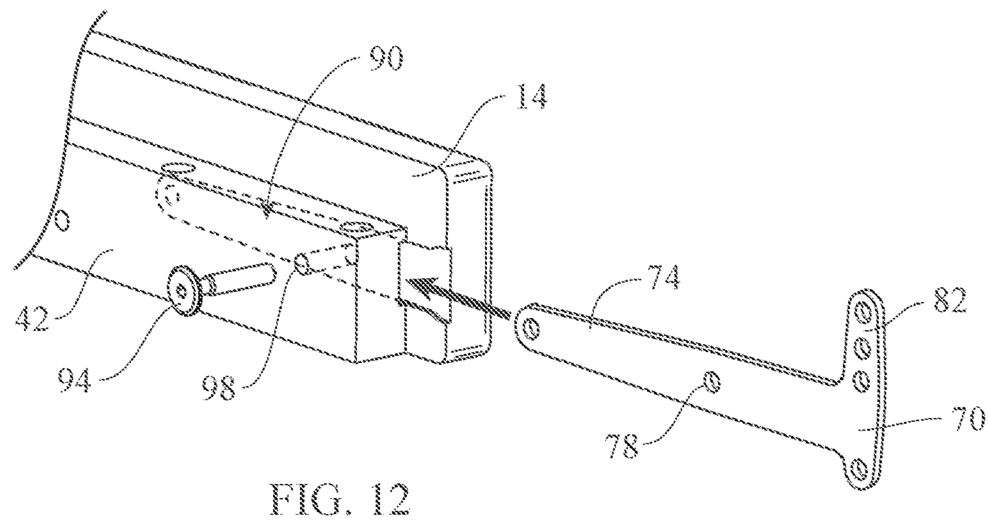
FIG. 12 shows a perspective view drawing of the rail bracket and bed rail.

FIG. 12 shows a rail bracket 70 in conjunction with a rail 14. The rail 14 includes a pocket 90 which receives the horizontal arm 74 of the rail bracket 70. The pocket may be formed in the rail cleat 42 and may be bounded by the rail 14 and rail cleat 42 along much of the length of the rail pocket 90. The horizontal arm 74 is inserted into the bracket pocket 90 and a fastener 94 such as a bolt is secured through a hole 98 in the rail 14 which is aligned with a hole 78 in the horizontal arm 74. The horizontal arm 74 is the same length and shape for both the long rail bracket 70 and the short rail bracket 70 and the holes 78 are in the same position for both the long rail bracket and the short rail bracket. This allows the long and short brackets to be used interchangeably by inserting the horizontal arm 74 of the desired bracket into the pockets 90 in the bed rails 14.

Figure 13:
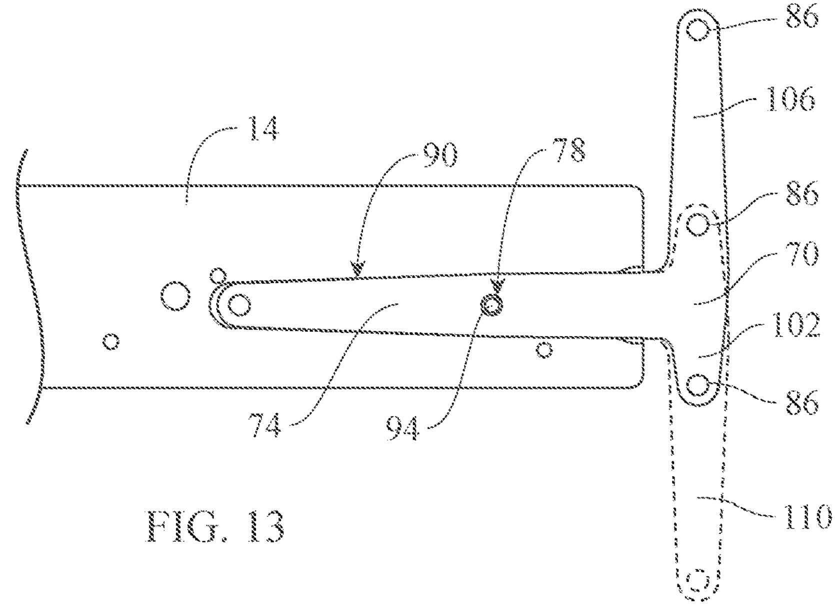
FIG. 13 shows a side view drawing of the rail bracket and bed rail.
Figure 14:
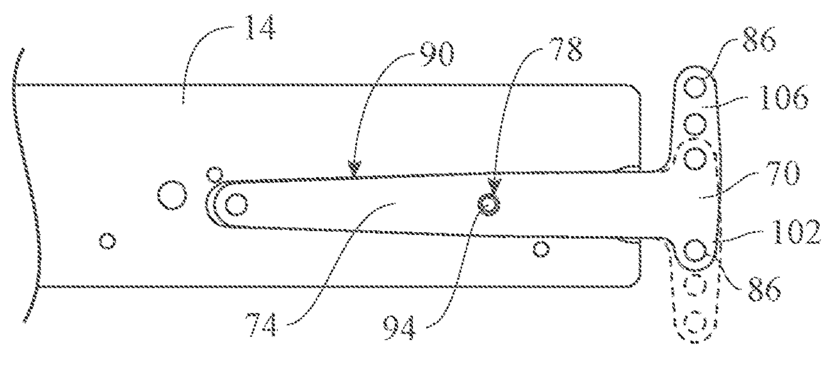
FIG. 14 shows a side view drawing of the rail bracket and bed rail.

FIGS. 13 and 14 show cross-sectional drawings of the rail 14 and rail bracket 70. FIG. 13 shows a long rail bracket 70 with a taller or longer vertical head 82. FIG. 14 shows a short rail bracket 70 with a shorter vertical head 82. The horizontal arm 74 is positioned in the rail socket 90 and fastener 94 extends through hole 78 and attaches the bracket 70 to the rail 14, such as by threading into the rail 14, a hole in the rail 14, or a threaded insert. The vertical head 82 is positioned near the end of the rail 14 in a suitable location for attachment to a bed leg, post, headboard, or footboard. The vertical head 82 for each bracket 70 provides for a rigid attachment between the rail 14 and the bed component being attached to the vertical head 82. The vertical head 82 includes a shorter lower section 102 which extends down below the horizontal arm 74 and a longer upper section 106 which extends up above the horizontal arm 74. Dashed lines 110 indicate how the rail bracket 70 can be inverted to place the longer section 106 below the horizontal arm 74 and the shorter section 102 above the horizontal arm 74. This allows for further modularity within the bed system while maintaining rigidity and while minimizing the number of reliefs or pockets needed in a corresponding part. The rail bracket 70 can be attached to the rail 14 with the longer vertical arm segment 106 above the horizontal arm 74 when attaching the rail 14 to the bottom of a post 114 to place the rail at or near ground level. The rail bracket 70 can be inverted with the longer vertical arm segment 106 below the horizontal rail arm 74 when attaching the rail 14 to a post at an elevated position. This places the longer vertical arm 110 beneath the bed frame 12 and keeps the brackets 70 hidden from view. The shorter vertical arm 102 allows the rail 14 to be placed closer to a floor or headboard and the longer vertical arm 106 provides greater strength and stability to the joint and strengthens the joint against rocking back and forth.

Figure 15:
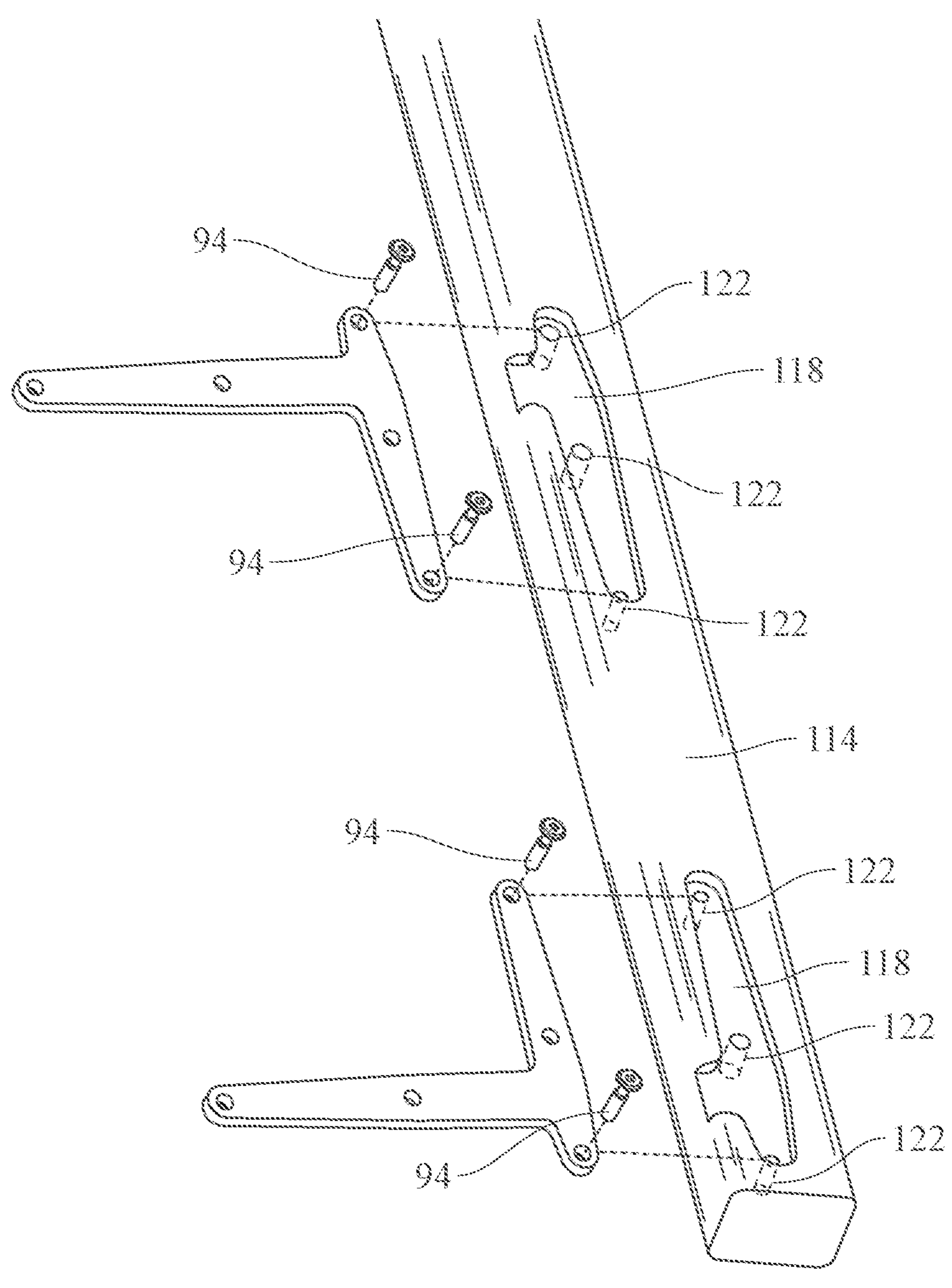
FIG. 15 shows a perspective view drawing of the rail bracket and bed post.
Figure 16:
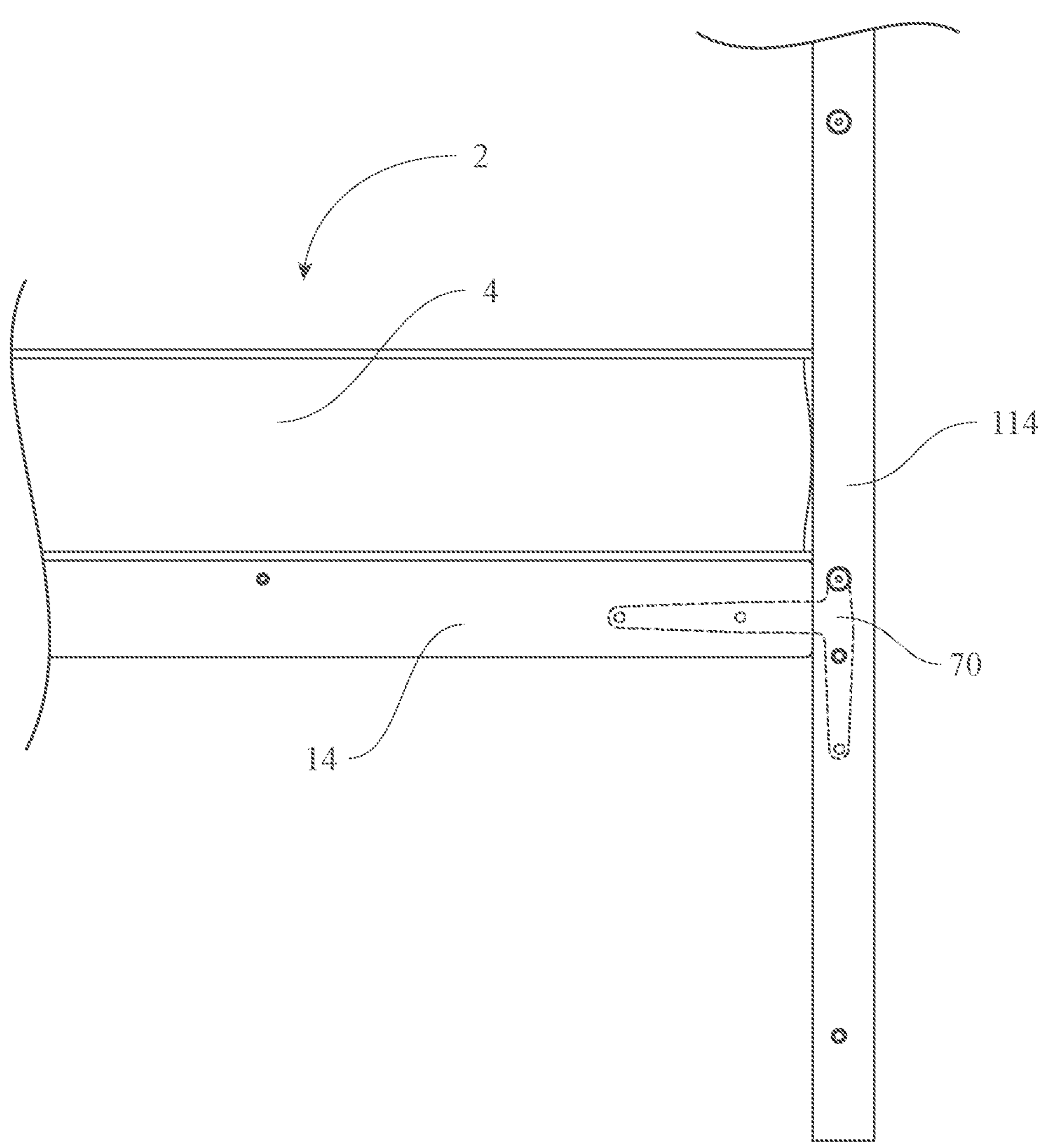
FIG. 16 shows a side view drawing of the rail bracket, bed rail, and bed post.

FIG. 15 shows an example bed post 114 with vertical recesses 118 which receive the vertical head 82 of the rail bracket 70. The vertical recesses 118 are shaped to snugly receive the vertical arms 102, 106 of the rail brackets 70. The post 114 also includes holes 122 which are aligned with holes 86 in the rail brackets 70 and which receive fasteners 94 to secure the rail brackets 70 to the post 114. The various holes 122 may be threaded inserts, through holes, etc. The lower recess 118 is oriented to place the longer vertical arm 106 of the vertical head 82 up. This allows the rail bracket 70 to be used to attach a bed rail 14 near the bottom of the post 114 and strengthens the bottom of the post. The upper recess 118 is oriented to place the longer vertical arm 106 of the vertical head 82 down. This allows the rail bracket 70 to be used to attach a bed rail 14 higher on the post without having the rail bracket 70 extending upwardly past the rail 14. The elongate arm segment 106 strengthens the post 114 and the rail/post joint. The upper recess 118 and lower recess 118 place the rail bracket 70 in a position where it is hidden and generally invisible to the end user while still allowing a longer rail bracket head 82. FIG. 16 shows a portion of an assembled bed 2 and illustrates how the rail bracket 70 is used to attach the bed rail 14 to a bed post 114 to support a mattress 4. The bed post 114 may form part of a headboard 6 or footboard 8.

The short rail bracket 70 allows the user to attach a headboard 6 and/or footboard 8 to their bed frame should they so desire. In this configuration, the horizontal arm 74 is slid into its receiving pocket 90 in the side rail with the vertical head 82 pointing up. The vertical head 82 fits into a corresponding recess 118 at the bottom of the headboard stile 114 and the bracket 70 is secured into both the side rail 14 and headboard stile/post 114 with screws 94. In addition to providing a method of attachment, the rail bracket 70 also increases the rigidity of this attachment. The vertical head 82 greatly increases the amount of torque that would be required to break the connection between the headboard 6 and the bracket 70.

Figure 17:
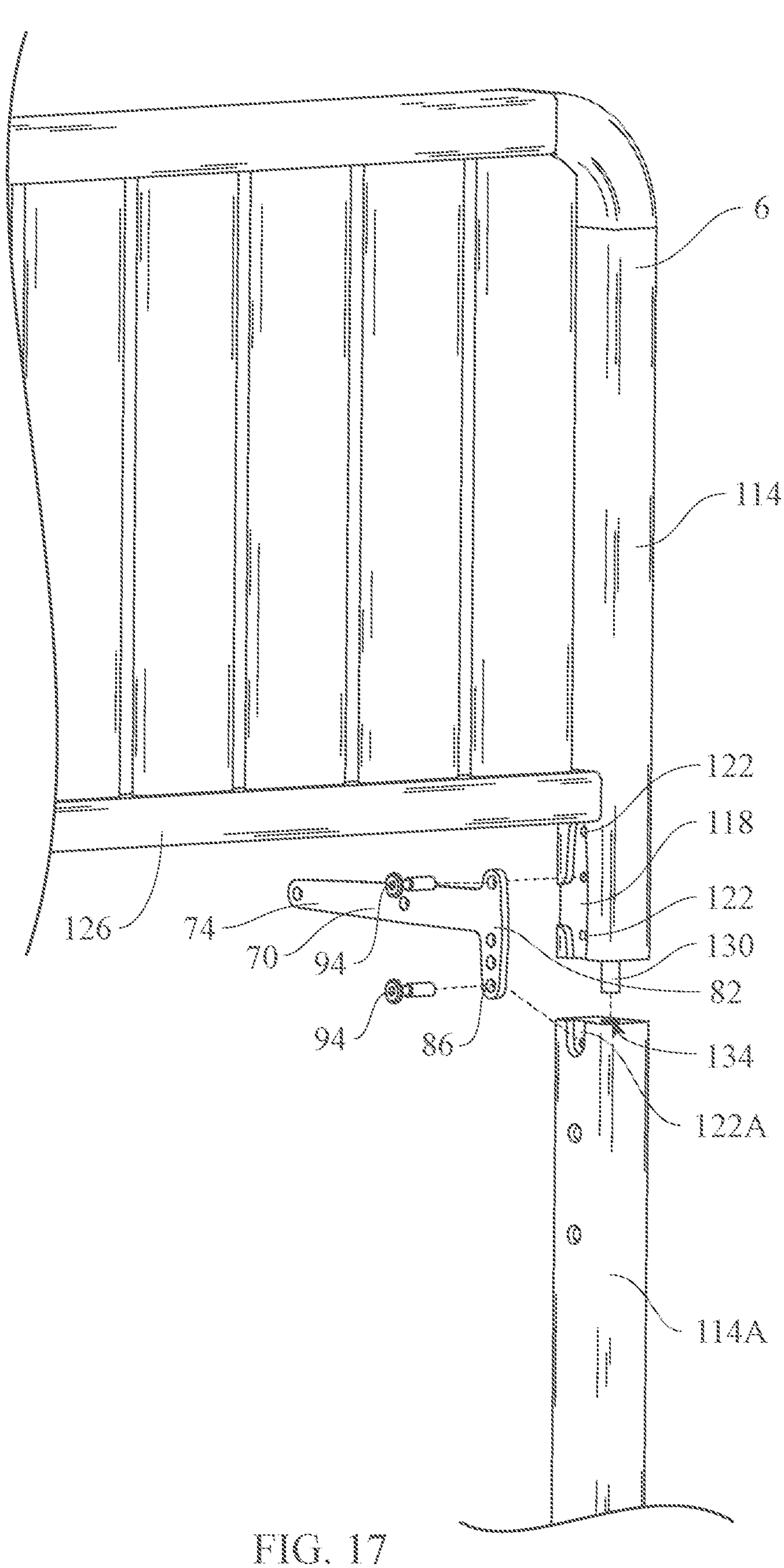
FIG. 17 shows a perspective view drawing of the rail bracket and bed head board.

FIG. 17 shows a perspective view of the attachment between the bracket 70 and a headboard 6. Where a single bed is assembled, the rail bracket 70 is typically installed with the long section 106 of the vertical head 82 oriented upwardly. The distance between the bottom of the stile/leg 114 and the headboard lower rail 126 is limited by the length of the rail bracket 70 and a short bracket 70 with a shorter vertical head 82 allows for a smaller space between the bottom end of the headboard vertical stile/leg 114 and the bottom of the horizontal rail 126.

The short rail bracket 70 also allows the user to transition the bed to be the top bunk of a bunk or loft bed. In this configuration, a post extension 114A is attached to the bottom of the post 114 which forms part of the headboard. A similar joint is used at the foot of the bed. The horizontal arm of the rail bracket 70 is slid into its receiving pocket 90 in the side rail 14, with the long section 106 of the vertical head 82 pointing down. The bracket vertical head fits into the same recess 118 in the headboard as described above while extending below the bottom of the headboard post 114. The bottom facing end of the rail bracket 70 fits into a corresponding partial recess 122A at the top of the bunk/loft bed post extension 114A. The bracket is secured into the bed rail 14, headboard post 114, and bunk bed post 114A with screws 94. A structural pin 130 such as a wooden dowel or metal pin is inserted into corresponding holes 134 in the headboard post 114 and bunk bed post 114A. The pin 130 aligns and strengthens the connection between the headboard post 114 and bunk bed post 114A. The vertical head 82 of the rail bracket 70 prevents the headboard post 114 and bunk/loft post 114A from pulling apart as the bed shifts during regular use and strengthens the joint.

Figures 18, 19:
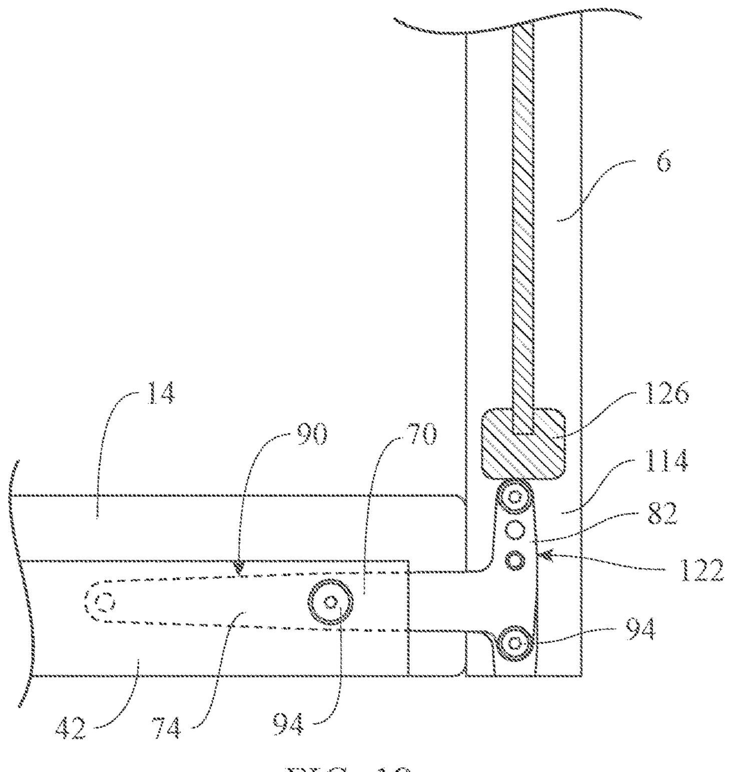
FIG. 18 shows a sectional view drawing of the rail bracket and head board.
FIG. 19 shows a side view drawing of the rail bracket and head board.

FIG. 18 shows a sectional view of the headboard 6 and rail 14 with the rail bracket 70 positioned to create a single bed. The rail bracket 70 is oriented with the longer arm segment facing upwardly to allow the rail 14 to be positioned near the floor while still utilizing a longer vertical head 82 to connect the rail and provide a stable joint that opposes racking of the joint. FIG. 19 shows a side view of the headboard 6 and rail 14 with the rail bracket 70 inverted and attached to a bunk bed post 114A to create a bunk bed or loft bed. The longer vertical arm extends downwardly and securely connects the rail extension 114A to the rail 114. This prevents accidental separation of these pieces and increases the safety of the joint. One benefit of the joint design is that all of the hardware used to assemble the single bed shown in FIG. 18 is also used to assemble the bunk bed or loft bed. The additional parts used to create the loft/bunk bed are less expensive as the user is not replacing previously used hardware brackets with different brackets. The original bed is also not provided to the user with unused hardware that must be stored until a bunk or loft bed is desired. Such unused hardware is typically lost or discarded and is then unavailable when later needed.

A long rail bracket 70 may be used where there is additional space between the bottom of the post 114 and a headboard or footboard rail 126. The long rail bracket 70 functions similarly to the short rail bracket 70 and provides additional strength. Where a bed post 114 or a bunk bed post 114A is manufactured as shown in FIG. 15, the user may transition the bed to be a low bed or a high bed or to be the lower bunk of a bunk bed in either a high or low position based on which recess 122 is used. In both of these configurations, the horizontal arm 74 of the rail bracket 70 is slid into and fastened into the corresponding recess 122 in the side rail.

In the high bed position, the longer section 106 of the vertical head 82 is pointed down to provide more rigidity to the bottom section of the post 114/114A. In the low bed position, the longer section 106 of the vertical arm is pointed up to increase the rigidity of the post 114/114A between the top bunk headboard 6 and where the rail bracket 70 is attached to the bed post 114/114A.

In one configuration, the bed 2 may be configured as a loft bed where a bed is elevated off of the ground a significant distance to create a working or play space beneath the bed. The loft bed will have lengthened legs compared to a conventional bed. A long rail bracket 70 is used to attach a horizontal support rail to the back of the loft bed. This horizontal support rail helps prevent the legs from "walking out" from under the bed. The vertical head 82 of the long rail bracket 70 is attached to a pocket 118 in the leg 114/114A. The horizontal arm 74 of the rail bracket 70 is attached to a pocket or recess 90 in the horizontal support rail.

Figure 20:
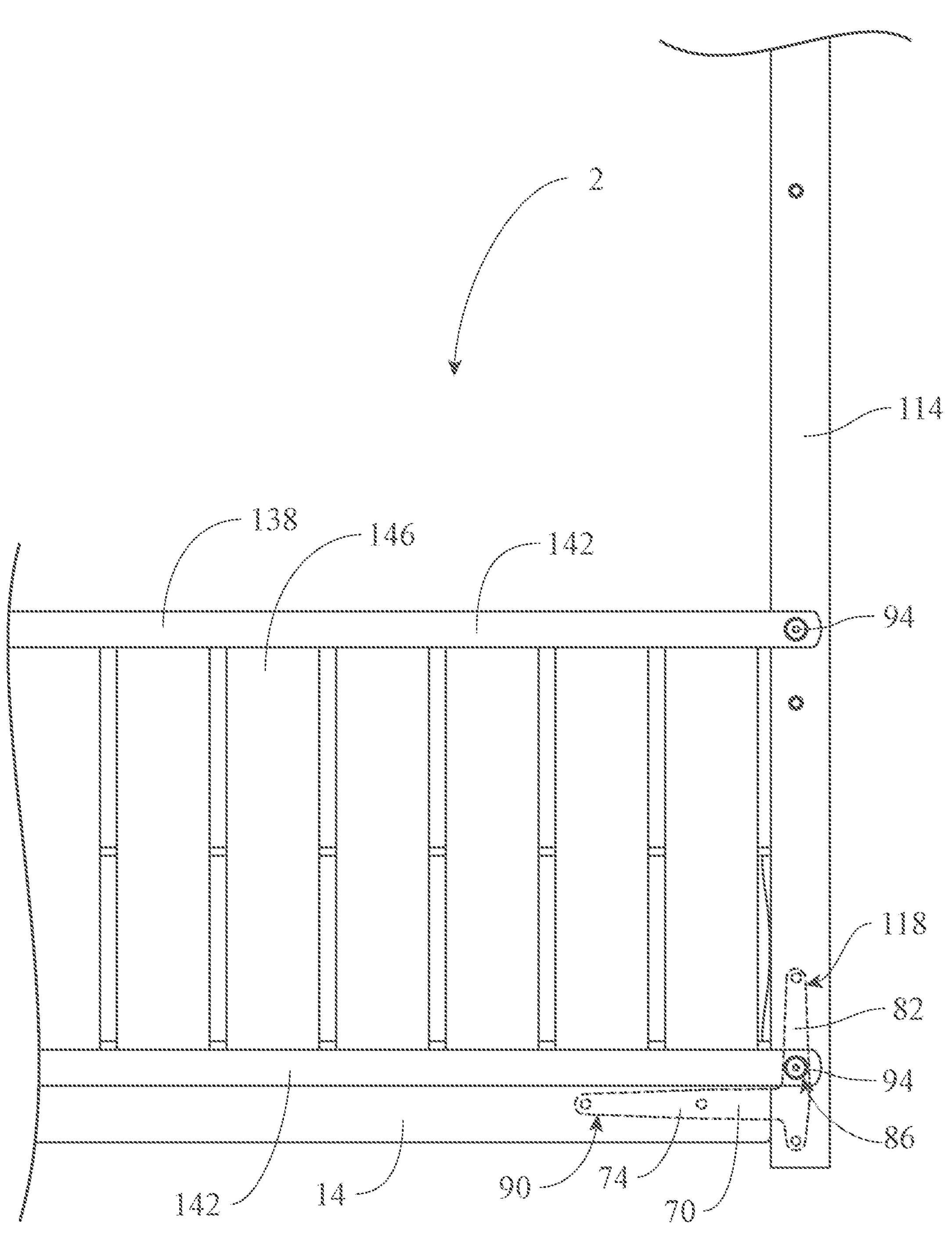
FIG. 20 shows a side view drawing of the rail bracket, bed rail, and bed post.

FIG. 20 shows how sideboards 138 of various lengths and configurations can be attached to the outside of the headboard and/or the outside of the side rail with screws 94. Sideboards 138 may include horizontal rails 142 and slats 146 attached to the rails. In attaching the sideboard near the rail 14, the screw 94 may pass through a hole 86 in the rail bracket 70. The sideboards 138 may be decorative and also provide additional safety in making it more difficult for children to fall out of the bed 2.

Figure 21:
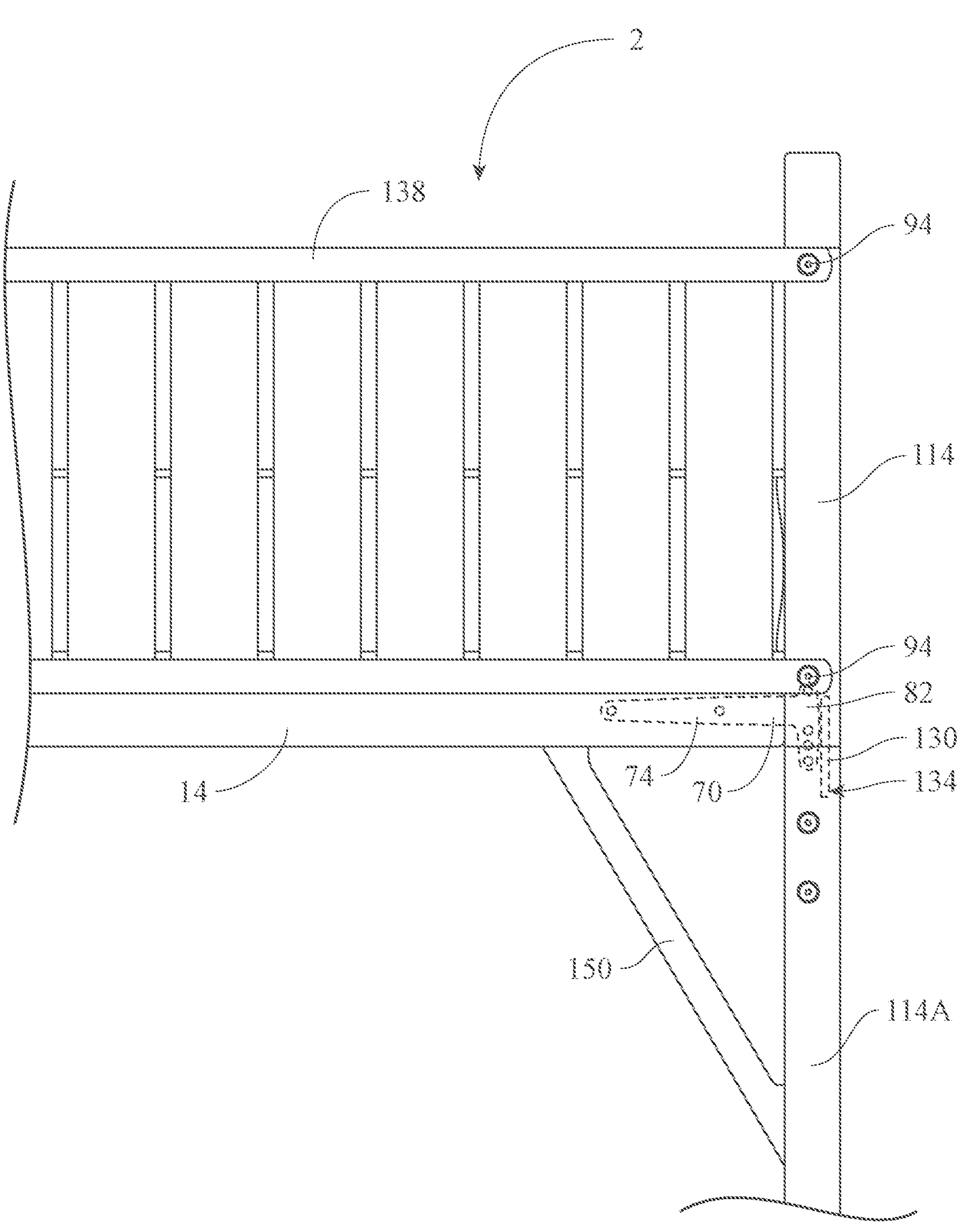
FIG. 21 shows a side view drawing of the rail bracket, bed rail, and bed post.

FIG. 21 illustrates how diagonal corner braces 150 may be used to further increase the rigidity of each corner of the bed 2 when the bed is configured as a loft bed or bunk bed. Corner braces 150 are used in conjunction with the pins 130 and rail brackets 70.

Figure 22:
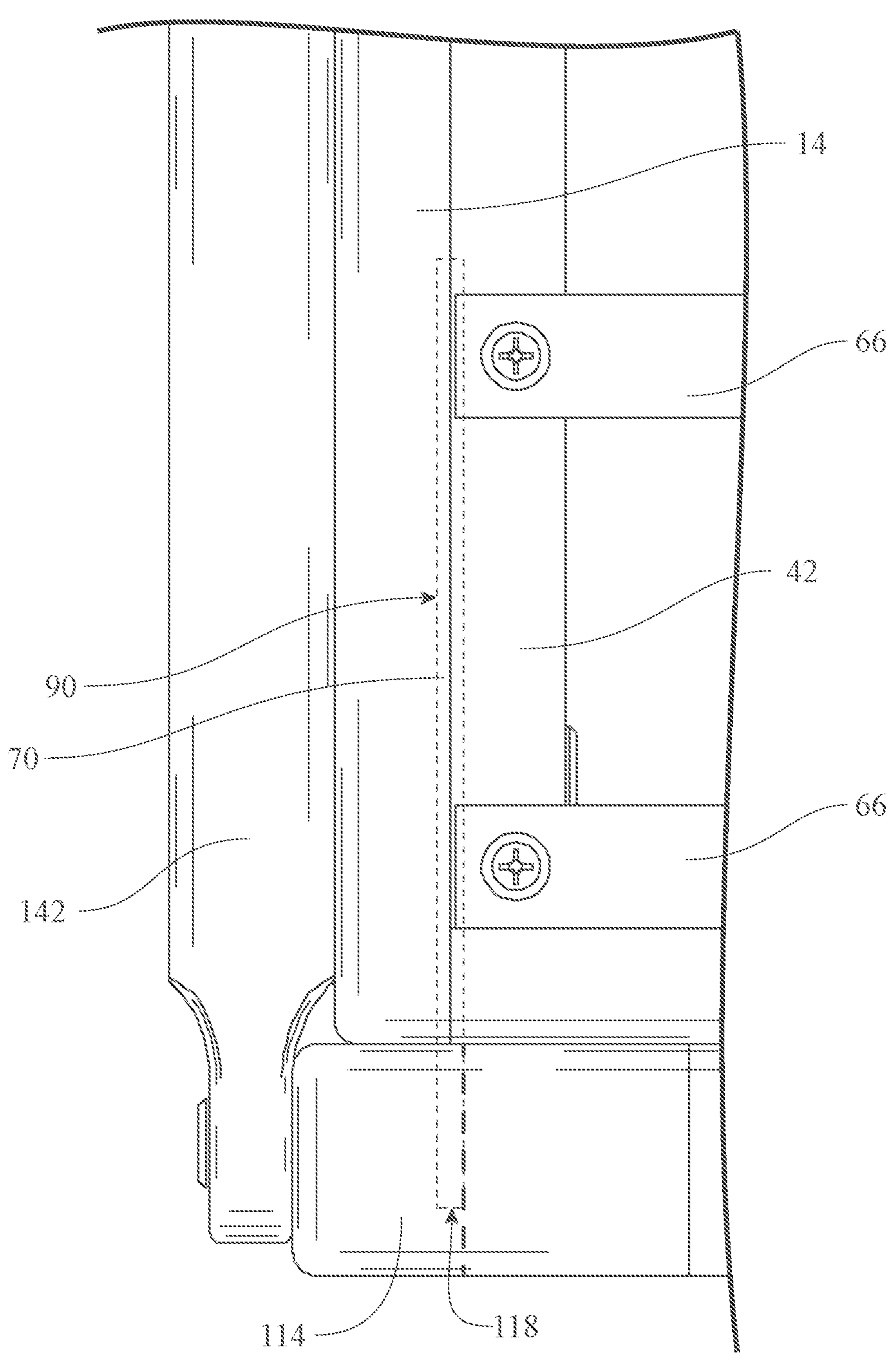
FIG. 22 shows a top view drawing of the rail bracket, bed rail, and bed post.

FIG. 22 shows a top view of the corner of a bed 2. The bracket 70 is visible in dashed lines. Placement of the horizontal arm 74 of the bracket 70 into a pocket 90 which is located at the inner side of the rail 14 places the bracket at a desirable position relative to the post 114. The rail 14 is slightly inset from the side of the post 114. The rail 142 of a sideboard 138 may have a narrowed end where it is attached to the post 114, allowing the rail 142 to fit flush with the side rail 14 of the bed 2. The configuration of the rail bracket 70 provides a versatile modular system that allows a bed to be configured as a traditional bed, an elevated bed, a bunk bed, or a loft bed. A single bracket may be flipped vertically and placed in varying positions to facilitate the different bed configurations. The combination of the horizontal arm 74 and vertical head 82 provides a strong joint and stabilizes the bed. The bracket 70, pockets 90, recesses 118, and other associated components provide increased strength over conventional bed hardware, resulting in a bed which is safer, more stable, more durable, and more appealing to the end user. The bed can be configured into different configurations while maintaining increased strength and appearance and without requiring different hardware. Expansion of the bed into a loft bed or bunk bed again reuses the existing hardware and increases strength in the resulting design.

The above description of illustrated examples of the present invention, including what is described in the Abstract, is not intended to be exhaustive or to be limiting to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A bed comprising: a horizontal frame rail; a frame rail bracket having a horizontal rail arm and a vertical bracket head attached to an end of the horizontal rail arm, the vertical bracket head having a first arm segment extending a first direction generally perpendicular to the horizontal frame rail and a second arm segment extending a second direction opposite the first direction; wherein the first arm segment is of a first length and the second arm segment is of a second length, and wherein the second length is less than the first length; a vertical post, the vertical post having a first attachment position and a second attachment position; wherein the horizontal rail arm is attached to the horizontal frame rail; wherein, in a first configuration, the vertical bracket head is attached to the first attachment position with the first arm segment extending upwardly from the horizontal rail arm; and wherein, in a second configuration, the vertical bracket head is attached to the second attachment position with the first arm segment extending downwardly from the horizontal rail arm.

2. The bed of claim 1, wherein the first attachment position comprises a first recess having a shape that is complementary to the vertical bracket head to receive the vertical bracket head therein, and wherein the second attachment position comprises a second recess having a shape that is complementary to the vertical bracket head to receive the vertical bracket head therein.

3. The bed of claim 1, wherein the first attachment position is located near a bottom of the vertical post and is configured to position the horizontal frame rail at a first height relative to a floor, and wherein the second attachment position is located a distance above the first attachment point to position the horizontal frame rail at a second height greater than the first height.

4. The bed of claim 1, wherein the horizontal frame rail comprises a rail pocket which is complementary in shape to the horizontal rail arm and which receives horizontal rail arm.

5. The bed of claim 1, wherein, in the second configuration, the first arm segment extends downwardly past a lower end of the vertical post, wherein the bed comprises a post extension attached to the lower end of the vertical post, and wherein the first arm segment is attached to an upper end of the post extension.

6. The bed of claim 5, further comprising a structural pin positioned in a hole in the lower end of the vertical post and in a hole in the upper end of the post extension whereby the structural pin extends between the vertical post and the post extension.

7. The bed of claim 1, wherein the first arm segment has a length which is between two and five times a length of the second arm segment.

8. A bed comprising: a horizontal frame rail; a frame rail bracket having a horizontal rail arm and a vertical bracket head attached to an end of the horizontal rail arm, the vertical bracket head having a first arm segment extending a first direction generally perpendicular to the horizontal frame rail and a second arm segment extending a second direction opposite the first direction; a vertical post; wherein the horizontal rail arm is attached to the horizontal frame rail; wherein, in a first configuration, the vertical bracket head is attached to the vertical post with the first arm segment extending upwardly from the horizontal rail arm; and wherein, in a second configuration, the vertical bracket head is attached to the vertical post with the first arm segment extending downwardly from the horizontal rail arm.

9. The bed of claim 8, wherein the first arm segment comprises a segment having a first length and wherein the second arm segment comprises a segment having a second length which is less than the first length.

10. The bed of claim 8, wherein, in the second configuration the bed comprises a vertical post extension attached to a bottom end of the vertical post, and wherein the first arm segment extends downwardly past a bottom end of the vertical post and is attached to a top end of the post extension.

11. The bed of claim 8, wherein, in the first configuration, the vertical bracket head is attached to the vertical post at a first location on the post having a first height, and wherein, in the second configuration, the vertical bracket head is attached to the vertical post at a second location on the post which is different from the first location and which has a second height different from the first height.

12. The bed of claim 8, wherein, in the first configuration, the vertical bracket head is attached to the vertical post at a first attachment position which is located near a bottom of the vertical post and is configured to position the horizontal frame rail at a first height relative to a floor, and wherein, in the second configuration, the vertical bracket head is attached to the vertical post at a second attachment position which is located a distance above the first attachment point to position the horizontal frame rail at a second height greater than the first height.

13. The bed of claim 8, wherein, in the first configuration, the vertical bracket head is attached to the post at a first attachment position which comprises a first recess having a shape that is complementary to the vertical bracket head to receive the vertical bracket head therein, and wherein, in the second configuration, the vertical bracket head is attached to the post at a second attachment position which comprises a second recess having a shape that is complementary to the vertical bracket head to receive the vertical bracket head therein.

14. The bed of claim 8, wherein the horizontal frame rail comprises a rail pocket which is complementary in shape to the horizontal rail arm and which receives horizontal rail arm.

15. The bed of claim 8, wherein the vertical post comprises a first recess which is complementary in shape to the vertical bracket head and which allows the vertical bracket head to be mounted to the vertical post in the first configuration, and wherein the vertical post comprises a second recess which is complementary in shape to the vertical bracket head and which allows the vertical bracket head to be mounted to the vertical post in the second configuration.

16. The bed of claim 8, wherein the vertical post comprises a first recess which is complementary in shape to the vertical bracket head and which allows the vertical bracket head to be alternately mounted to the vertical post in the first configuration or in the second configuration.

17. The bed of claim 8, wherein the first arm segment has a length which is between two and five times a length of the second arm segment.

* * * * *